United States Patent
Rogers et al.

(10) Patent No.: US 9,060,355 B2
(45) Date of Patent: Jun. 16, 2015

(54) MESSAGE HANDLING

(71) Applicant: NVIDIA Corporation, Santa Clara, CA (US)

(72) Inventors: Tim Rogers, Cambridge (GB); Alexander May-Weymann, Sophia Antipolis (FR)

(73) Assignee: NVIDIA CORPORATION, Santa Clara, CA (US)

( * ) Notice: Subject to any disclaimer, the term of this patent is extended or adjusted under 35 U.S.C. 154(b) by 172 days.

(21) Appl. No.: 13/896,590

(22) Filed: May 17, 2013

(65) Prior Publication Data
US 2014/0342723 A1    Nov. 20, 2014

(51) Int. Cl.
*H04M 3/00*      (2006.01)
*H04W 76/04*    (2009.01)

(52) U.S. Cl.
CPC .................................... *H04W 76/04* (2013.01)

(58) Field of Classification Search
CPC .................................................... H04W 76/04
USPC ............. 455/412.1–414.2, 418–422.1, 550.1, 455/556.2, 561, 67.11, 453, 455; 370/328, 370/331, 332, 338
See application file for complete search history.

(56) References Cited

U.S. PATENT DOCUMENTS 7,940,770 B2    5/2011  Moon et al.
2004/0001455 A1 *  1/2004  Matto et al. ................... 370/328

OTHER PUBLICATIONS

Sophia Antipolis (TSG-RAN WG3 meeting #7, Sep. 20, 1999).*
"LS on Uplink Core Network Layer 3 Message Numbering," TSG-RAN WG3 Meeting #7, TSGR3#7 (99) B09, Sophia Antipolis, Sep. 20-24, 1999, 3 pages.
Technical Specification Group Core Network and Terminals; mobile Radio Interface Layer 3 Specification; Core Network Protocols; Stage 3 (Release 12); 3GPP TS 24.008 V12.0.0, Dec. 2012, 54 pages.
Foreign Communication From a Related Counterpart Application, German Application No. 10 2013 014 710.7; Examination Report dated Jan. 8, 2014.

* cited by examiner

*Primary Examiner* — Babar Sarwar

(57) ABSTRACT

A method of handling messages at a user equipment received from a communications network during a procedure, the method implemented at the user equipment comprising: receiving a first message from the network while the user equipment is in a first operating state; processing the first message and entering a second operating state in response to receiving the first message; receiving a second message from the network while the user equipment is in the second operating state; detecting that the second message is a duplicate of the first message; and checking for an indication that the second message is a potential duplicate of the first message. If the indication is not present, the method further comprises transmitting a failure notification to the network. If the indication is present, the method further comprises discarding the second message and not transmitting a failure notification to the network to prevent failure of the procedure.

20 Claims, 5 Drawing Sheets

MESSAGE HANDLING

TECHNICAL FIELD

This application relates to handling messages at a user equipment received from a communications network during a procedure.

BACKGROUND

In a communication system, a device (typically a mobile device) termed user equipment (UE) communicates wirelessly with a core network via a radio access network. Communications between the UE and the radio access network are effected in accordance with a multi-layered communications protocol.

The multi-layered communications protocol is typically represented as comprising an access stratum (AS) which includes a plurality of layers responsible for transporting data between the UE and the radio access network, and a Non-access stratum (NAS) which represents a set of higher layer protocols which use the AS to transfer data between the UE and the radio access network. The NAS is divided into two sub-layers: the Connection Management (CM) sub-layer and the Mobility Management (MM) sub-layer. The CM sub-layer includes call control protocol entities which are responsible for establishing, maintaining and terminating calls between the UE and core network.

The call control protocol is described in more detail in chapter 5.1 of the document "3rd Generation Partnership Project; Technical Specification Group Core Network and Terminals; Mobile radio interface Layer 3 specification; Core network protocols" Serial No. 3GPP TS 24.008 specification.

SUMMARY

According to one aspect, there is provided a method. In one embodiment the method is a method of handling messages at a user equipment received from a communications network during a procedure. The method implemented at the user equipment comprises receiving a first message from the communications network whilst the user equipment is in a first operating state. The method further comprises processing the first message and entering a second operating state in response to receiving the first message. The method continues with receiving a second message from the communications network whilst the user equipment is in the second operating state and detecting that the second message is a duplicate of the first message. The method further comprises checking for an indication that the second message is a potential duplicate of the first message. If the indication is not present, the method further comprises transmitting a failure notification to the communications. If the indication is present, the method further comprises discarding the second message and not transmitting a failure notification to the communications network to prevent failure of the procedure.

According to another aspect, there is provided a user equipment. In one embodiment, the user equipment comprises a transceiver, a central processing unit, and a memory. The transceiver is operable to access a communications network. The memory is coupled to the central processing unit and contains program code executable by the central processing unit causing the central processing unit to perform the following steps. In response to receiving a first message from the communications network via the transceiver whilst the user equipment is in a first operating state, the central processing unit processes the first message causing the user equipment to enter a second operating state. In response to receiving the second message from the communications network via the transceiver whilst the user equipment is in the second operating state, the central processing unit detects that the second message is a duplicate. The central processing unit checks for an indication that the second message is a potential duplicate of the first message where, if the indication is not present, a failure notification is transmitted to the communications network via the transceiver and if the indication is present, the second message is discarded and a failure notification is not transmitted to the communications network to prevent failure of the procedure.

In yet another aspect, there is provided a computer program product. In one embodiment, the computer program produce is a computer program product for handling messages at a user equipment received from a communications network during a procedure. The computer program product comprises code embodied on a non-transient computer-readable medium and is configured so as when executed on a processing unit of the user equipment to perform the following steps. A first message from the communications network is received whilst the user equipment is in a first operating state. The first message is processed and a second operating state is entered in response to receiving the first message. A second message is received from the communications network whilst the user equipment is in a second operating state. Detecting if the second message is duplicate of the first message is performed. An indication that the second message is potential duplicate of the first message is checked for. If the indication is not present, a failure notification to the communication network is transmitted. If the indication is present, the second message is discarded and a failure notification to the communications network is not transmitted to prevent failure of the procedure.

BRIEF DESCRIPTION OF THE DRAWINGS

Reference is now made to the following descriptions taken in conjunction with the accompanying drawings, in which.

DETAILED DESCRIPTION

Figure 1:
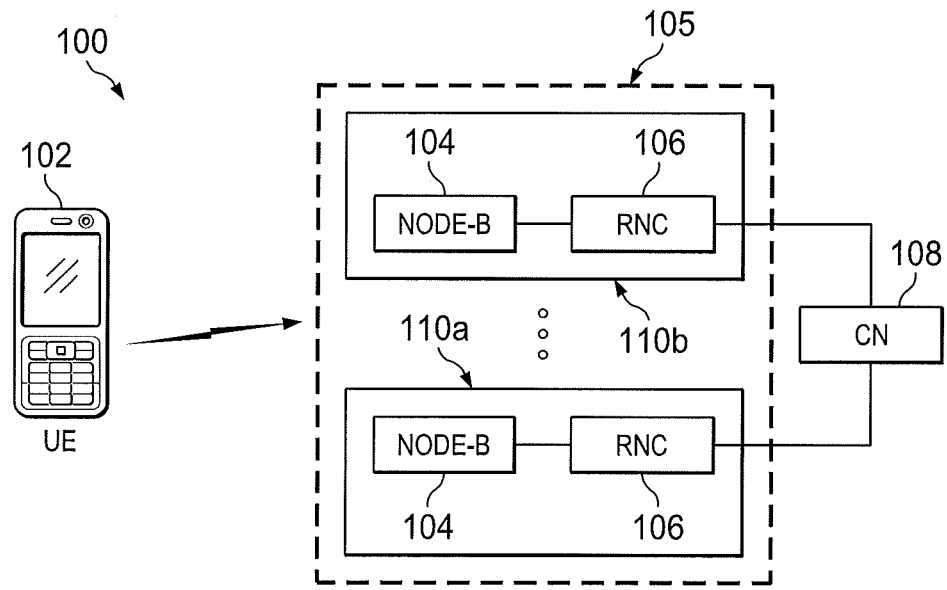
FIG. 1 shows a UMTS mobile communication system.

During a call setup, layer 3 messages are exchanged between a call control entity in the UE and the core network. Responsive to a call control entity at the UE receiving a layer 3 message from the core network, the call control entity changes state. The change in state of the call control entity is described in chapter 5.1 of the 3GPP TS 24.008 specification. If, after this change in state, the call control entity at the UE receives a duplicate layer 3 message from the core network, then the call control entity is not in the correct state for receiving the duplicate message and the UE is arranged to return a failure notification to the core network. This is described in more detail in chapter 8.4 of the 3GPP TS 24.008 specification.

It is recognized that in a practical network implementation the failure notification causes the core network to fail the call setup. This failure is immediately reported to the user of the UE. The inventors have further recognized, through observations in real network operation, that the most frequent cause of the duplication described above is due to a re-establishment in the Radio Link Control (RLC) layer of the access stratum of a signaling radio bearer.

According to one aspect of the present disclosure there is provided a method of handling messages at a user equipment received from a communications network during a procedure, the method implemented at the user equipment comprising: receiving a first message from the communications network whilst the user equipment is in a first operating state; processing the first message and entering a second operating state in response to receiving the first message; receiving a second message from the communications network whilst the user equipment is in the second operating state; detecting that the second message is a duplicate of the first message; and checking for an indication that the second message is a potential duplicate of the first message, wherein: if said indication is not present, the method comprising transmitting a failure notification to the communications network; and if said indication is present, the method comprising discarding the second message and not transmitting a failure notification to the communications network to prevent failure of said procedure.

The user equipment may be unable to process the second message whilst in the second operating state.

The user equipment may communicate with the communications network in accordance with a multi-layered communication protocol comprising a Non-Access Stratum (NAS) and the method steps described above may be implemented by a NAS entity.

The first message and second message may be a NAS message.

The step of checking for an indication that the second message is a potential duplicate of the first message may comprise determining if the second message was detected as potentially being a duplicate of the first message prior to receiving the second message. The step of determining may comprise the NAS entity determining if it had received said indication from a Radio Resource Control (RRC) layer of the multi-layered communication protocol prior to receiving the second message.

The RRC layer may be configured to transmit said indication to the NAS entity responsive to initiating a re-establishment, in a Radio Link Control (RLC) layer of the multi-layered communication protocol, of a signaling radio bearer used to transport NAS messages.

The step of the NAS entity checking for an indication may comprise determining if an indication is attached to the second message, said indication identifying that the second message is a potential duplicate of the first message.

The NAS entity may receive the second message from the communications network via a Radio Resource Control (RRC) layer of the multi-layered communication protocol.

The RRC layer may attach the indication to the second message and supply the second message together with said indication to the NAS entity if the second message is the first NAS message to be received from the communication network after the RRC layer initiating a re-establishment, in a Radio Link Control (RLC) layer of the multi-layered communication protocol, of a signaling radio bearer used to transport NAS messages.

The RRC layer of the multi-layered communication protocol may not attach the indication to the second message if the second message is not the first NAS message to be received from the communication network after the Radio Resource Control (RRC) layer initiating a re-establishment, in a Radio Link Control (RLC) layer of the multi-layered communication protocol, of a signaling radio bearer used to transport NAS messages.

The first operating state may be a first protocol state associated with the NAS entity and the second operating state may be a second protocol state associated with the NAS entity.

The procedure may be a call establishment procedure, and the NAS entity may be a Call Control entity.

The first operating state may be a first call control protocol state and the second operating state may be a second call control protocol state.

The NAS entity may be one of: a Short Message Service (SMS) entity; a Supplementary Services (SS) entity; a Session Management (SM) entity; and a Mobility Management (MM) entity.

Embodiments of the disclosure will now be described by way of example only.

With reference to FIG. 1, there is illustrated the main elements of a UMTS communication system, generally denoted by reference numeral 100. It will be understood that in FIG. 1 only sufficient elements of the system are shown in order to present the context of some of the arrangements of the disclosure.

The UMTS communication system 100 comprises a wireless communications device termed user equipment (UE) 102. The user equipment 102 may be a mobile telephone, a personal digital assistant (PDA), a computer or any other device that exchanges data wirelessly. The UE 102 is in communication with a UMTS Terrestrial Radio Access Network (UTRAN) 105. The UTRAN 105 comprises one or more radio network sub-systems 110a, 110b. A radio network sub-system is a sub-network within the UTRAN 105 and comprises a base station 104 (termed node-B) and a radio network controller (RNC) 106. A node-B 104 is a transceiver which sends and receives wireless signals and defines a cell region. A RNC 106 is the network element responsible for the control of the radio resources of the UTRAN 105. A dedicated physical channel is established between the UE 102 and the node-B 104 to allow data communication to take place there between. It will be appreciated that a plurality of UEs and radio network sub-systems may be present in the UTRAN 105, which for clarity purposes are not shown. The UTRAN 105 is in communication with a core network 108. The structure of a UMTS mobile communication system as illustrated in FIG. 1 is well-known to one skilled in the art, and the further operation of such a system is not described herein.

Figure 2:
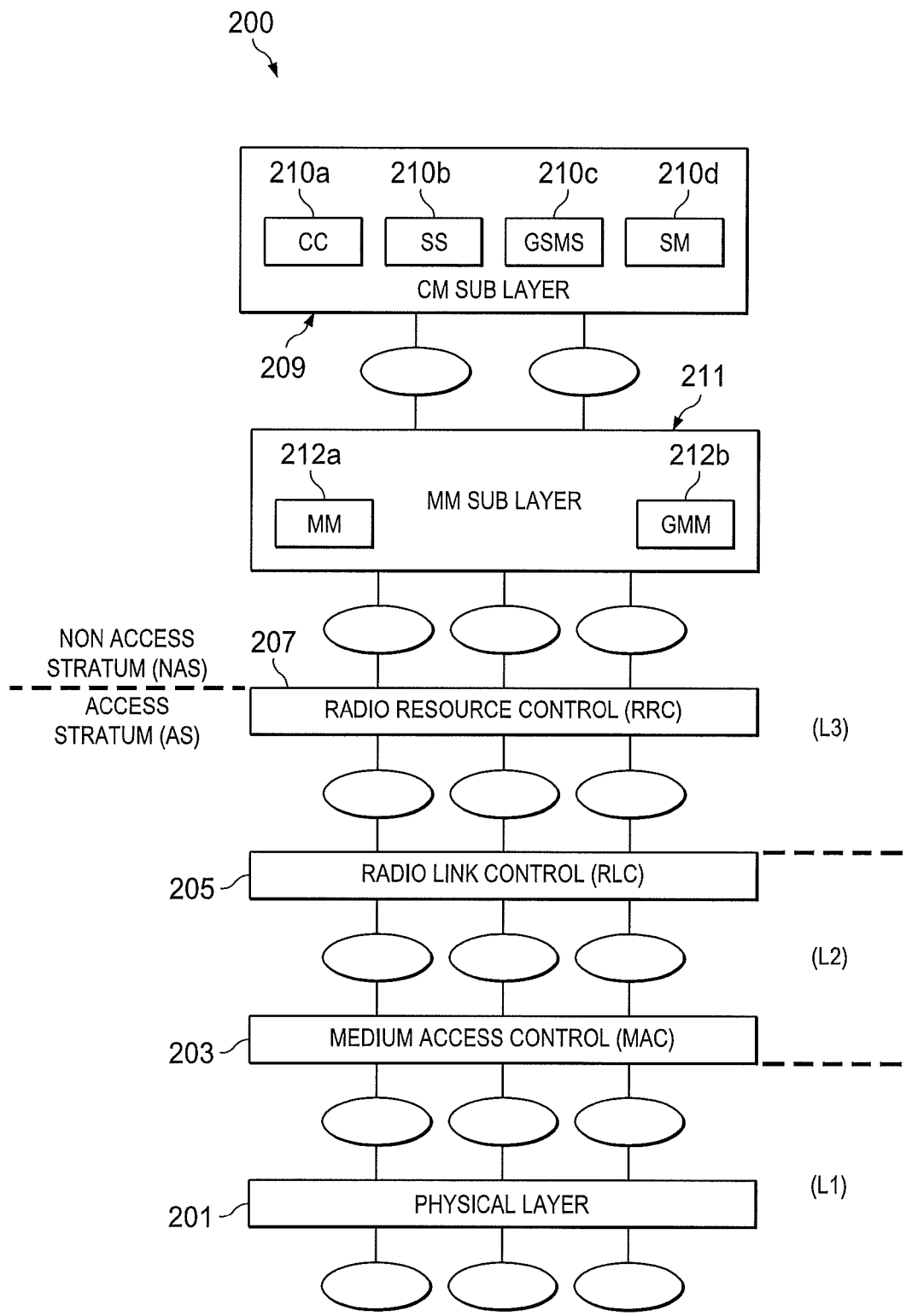
FIG. 2 shows a block diagram of a UMTS radio interface protocol architecture.

Referring to FIG. 2, there is shown a simplified block diagram of a UMTS radio interface protocol architecture 200. Communications between the UE 102 and the core network 108 via the UTRAN 105 are effected in accordance with the multi-layered communications protocol shown in FIG. 2. The UE 102 and core network 108 include both AS and NAS layers whereas the Node-B 104 and RNC 106 include only AS layers.

The protocol architecture comprises an AS which includes a plurality of layers, the plurality of layers including a first layer (L1) which includes a physical layer 201, above the first layer is a second layer (L2) which includes a Medium Access Control (MAC) layer 203 and a Radio Link Control (RLC) layer 205, and above the second layer is a third layer (L3) which includes a Radio Resource Control (RRC) layer 207.

Control interfaces (not shown in FIG. 2) between the RRC layer 207 and all the lower layer protocols are used by the RRC layer 207 to configure characteristics of the lower layer protocol entities, including parameters for the physical, transport and logical channels.

The RLC layer 205 provides services to higher layers for the transfer of user and/or control data. The service provided for user data is called Radio Bearer (RB) and the service provided for control data is called Signaling Radio Bearer (SRB). A SRB is associated with a signaling radio bearer queue and a logical channel. The RLC layer 205 may comprise multiple SRB's such that each SRB is associated with a signaling radio bearer queue and a logical channel. A SRB specifies the characteristics of a logical, transport and physical channel being used to transfer data between the UE 102 and core network 108, and different SRBs may be specified depending on the type of messages that are transferred.

When data is transmitted from the UE 102 to the UTRAN 105, data is passed from the RLC layer 205 to the MAC layer 203 using logical channels. The logical channel defines the type of information that is transferred. These logical channels include a common control channel (CCCH) and a dedicated control channel (DCCH). The CCCH is a bidirectional channel for transmitting control information between the UE 102 and the UTRAN 105. The DCCH is a bidirectional channel for transmitting control information between the UE 102 and the UTRAN 105, wherein the control information is dedicated to the particular UE. Other logical channels are well known to the persons skilled in the art and are not described herein. In the MAC layer 203 the logical channels are mapped to transport channels. In the physical layer 201 the transport channels are mapped onto physical channels. Thus with reference to FIG. 2, it can be seen that during a data transmission from the UE 102 to the UTRAN 105 data is passed down through the layer architecture 200. Similarly, when data is received at the UE 102 from the UTRAN 105, data is passed up through the layer architecture 200.

The NAS makes use of the AS to transfer data between the UE 102 and the core network 108 via the radio access network 105. As described above, the NAS is divided into two sub-layers: the Connection Management (CM) sub-layer 209 and the Mobility Management (MM) sub-layer 211. Both of these sub-layers belong to layer 3 of the overall protocol stack 200.

The CM sub-layer 209 comprises a call control (CC) entity 210a, a session management (SM) entity 210d, a GPRS SMS (GSMS) entity 210c, and a supplementary services (SS) entity 210b. The MM sub-layer 211 provides connectivity for the CM sub-layer 209 and comprises a mobility management (MM) entity 212a and GPRS mobility management (GMM) entity 212b. The MM entity 212a within the MM sub-layer 211 and the CC entity 210a within the CM sub-layer 209 are associated with circuit switched (CS) domain services, whereas the GMM entity 212b within the MM sub-layer 211 and the SM entity 210d within the CM sub-layer 209 are associated with packet switched (PS) domain services. The set of CM sub-layer entities shown in FIG. 2 is not exhaustive and other entities could be included. For example, the GSMS entity 210c is used if SMS are transferred using the PS core network domain, but an SMS entity is used if SMS are transferred using the CS core network domain (in this case an SMS entity would be included as part of the CM sub-layer 209).

The call control entity 210a of the CM sub-layer 209 is responsible for establishing, maintaining and terminating calls for the CS domain. In particular the call control entity 210a is responsible for establishing both mobile originated and mobile terminated calls for the CS core network (i.e., voice and video calls). Mobile originated calls can either be normal or emergency calls, whereas mobile terminated calls can only be a normal call (because emergency calls terminate at a fixed line rather than at a mobile).

Figure 3:
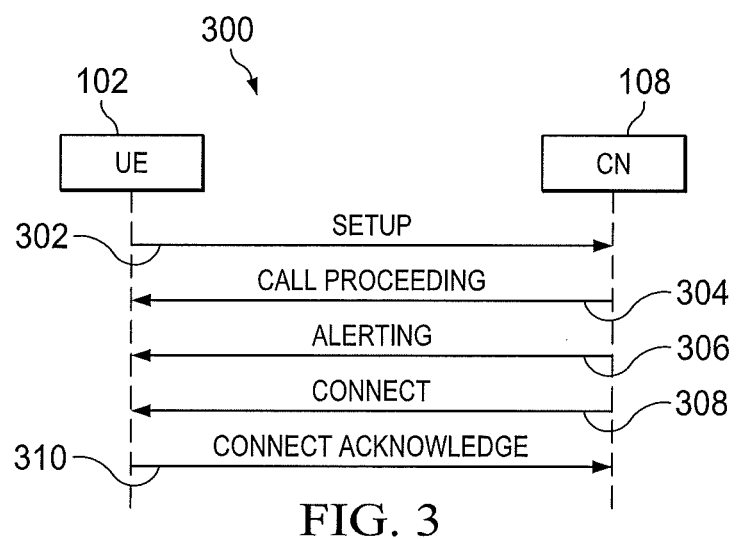
FIG. 3 shows a call establishment procedure.

A call procedure is now described with reference to FIG. 3. The call procedure 300 shown in FIG. 3 illustrates a mobile originating call establishment procedure which may be implemented by UE 102. The mobile originating call establishment procedure shown in FIG. 3 is described in detail in the 3GPP TS 24.008 specification, and is discussed briefly herein to place embodiments into context.

The call control entity 210a is arranged to operate in one of a plurality of protocol states, Fig. 5.1 of the 3GPP TS 24.008 specification provides an overview of these protocol states. Having entered a "MM connection pending" state, the call control entity 210a of the UE 102 sends a setup message 302 to its peer call control entity in the core network 108. That is, the call control entity 210a of the UE 102 sends the setup message 302 to the MM entity 212a for transmission to the core network 108 via the UTRAN 105. After transmitting the setup message 302, the call control entity 210a of the UE 102 enters a "call initiated" state.

Whilst in the "call initiated" state, the call control entity 210a of the UE 102 may receive a call proceeding message 304 from the core network 108 via the UTRAN 105. In response to receiving the call proceeding message 304, the call control entity 210a of the UE 102 enters a "mobile originating call proceeding" state.

Whilst in the "call initiated" state or the "mobile originating call proceeding" state, the call control entity 210a of the UE 102 may receive an alerting message 306 from the core network 108 via the UTRAN 105. In response to receiving the alerting message 306, the call control entity 210a of the UE 102 enters a "call delivered" state.

Whilst in the "call initiated" or the "mobile originating call proceeding" or the "call delivered" state, the call control entity 210a of the UE 102 may receive a connect message 308 from the core network 108 via the UTRAN 105. In response to receiving the connect message 308, the call control entity 210a of the UE 102 transmits a connect acknowledge message 310 to the core network 108 via the UTRAN 105 and enters a "call delivered" state.

In the mobile originating call establishment procedure described above, the UE 102 is able to process a call proceeding message 304, an alerting message 306, and a connect message 308 when the call control entity 210a of the UE 102 is in the "call initiated" state. That is, all of these messages are compatible with the "call initiated" state. The UE 102 is able to process an alerting message 306, and a connect message 308 when the call control entity 210a of the UE 102 is in the "mobile originating call proceeding" state. That is, the alerting message 306 and connect message 308 are compatible with the "mobile originating call proceeding" state. However the call control entity 210a of the UE 102 is unable to process the call proceeding message 304 when in the "mobile originating call proceeding" state, thus the call proceeding message 304 is incompatible with the "mobile originating call proceeding" state. The UE 102 is able to process a connect message 308 when the call control entity 210a of the UE 102 is in the "call delivered" state. That is, the connect message 308 is compatible with the "call delivered" state. However the call control entity 210a of the UE 102 is unable to process the call proceeding message 304 or the alerting message 306 when in the "call delivered" state, thus the call proceeding message 304 and the alerting message 306 are both incompatible with the "call delivered" state.

It will be appreciated from the description above, that if a duplicate message (i.e., a duplicate call proceeding message 304, a duplicate alerting message 306, or a duplicate connect message 308) is transmitted to the call control entity 210a of the UE 102 from the core network 108 via the UTRAN 105, the call control entity 210a of the UE 102 will receive the duplicate message in an incorrect state, i.e., the duplicate message will not be compatible with the protocol state of the call control entity 210a of the UE 102 such that the UE 102 will be unable to process the duplicate message. In this scenario, the UE 102 handles the duplicated message as described in chapter 8.4 of the 3GPP TS24.008 specification. That is, the UE 102 is arranged to return a failure notification to the core network 108. The failure notification is a status message indicating that the message type of the duplicate message is not compatible with the protocol state of the call control entity 210a of the UE 102. The term "duplicate" is used herein to refer to a message being of the same type as a previously received message.

For example, when the call control entity 210a of the UE 102 receives a call proceeding message 304 from the core network 108 via the UTRAN 105 whilst in the "call initiated" state, the call control entity 210a of the UE 102 enters a "mobile originating call proceeding" state. If the call control entity 210a of the UE 102 receives a duplicate call proceeding message 304 from the core network 108 via the UTRAN 105 whilst in the "mobile originating call proceeding" state the UE 102 will determine that the duplicate call proceeding message 304 is not compatible with the "mobile originating call proceeding" state and will return a failure notification (status message) to the core network 108 via the UTRAN 105.

As described above, it is recognized that in a practical network implementation the failure notification (status message) causes the core network 108 to fail the call establishment procedure 300. When the core network 108 receives the failure notification (status message) from the UE 102, the core network 108 typically releases the call, and the call release is immediately reported to the user of the UE.

The handling of messages received at the UE 102 will now be described with reference to FIGS. 4, 5 and 6.

Figure 4:
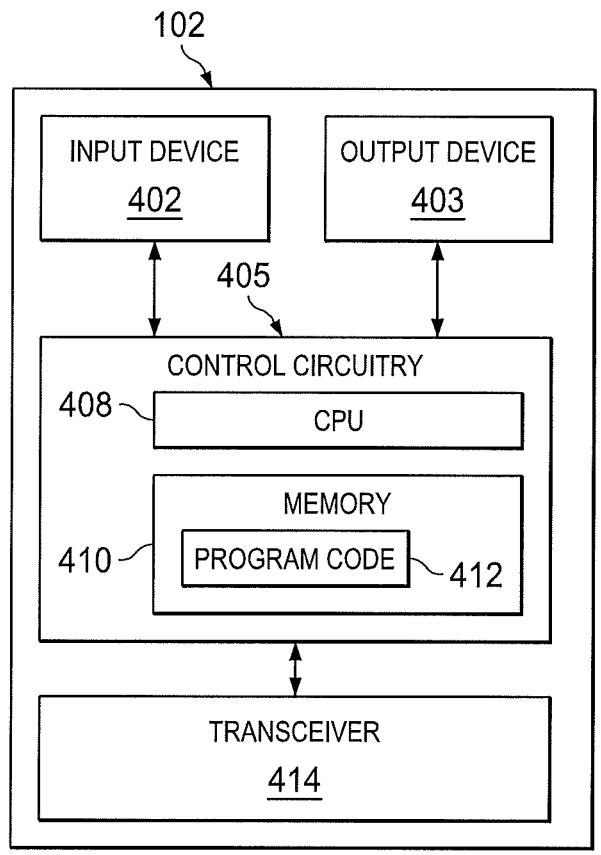
FIG. 4 is a block diagram of a user equipment.

FIG. 4 is a functional block diagram of a UE 102 according to the present disclosure. For simplicity, FIG. 4 only shows an input device 402, an output device 403, a control circuit 405, a central processing unit (CPU) 408, a memory 410, program code 412, and a transceiver 414 of the UE 102. The UE 102 can receive signals input by a user of the UE 102 through the input device 402, such as a keyboard, and can output images and sounds through the output device 403, such as a display or speakers. The transceiver 414 is used to receive and transmit wireless signals, deliver received signals to the control circuit 405, and output signals generated by the control circuit 405 wirelessly. In the UE 102, the control circuit 405 executes the program code 412 stored in the memory 410 through the CPU 408, thereby controlling an operation of the UE 102. The features of the techniques described below are platform-independent, meaning that the techniques may be implemented on a variety of commercial computing platforms having a variety of processors. The program code 412 can be stored in one or more non-transitory computer readable memory devices. The memory 410 may be volatile memory such as RAM or non-volatile memory such as flash (EEPROM). The memory 410 may be a component of the UE's circuitry or may be on machine-readable media, examples of which are well known in the art. Referring back to the UMTS radio interface protocol architecture 200 shown in FIG. 2, the transceiver 414 can be seen as a portion of Layer 1, and the control circuit 405 can be utilized to realize functions of Layer 2 and Layer 3.

The CPU 408 executes the program code 412 so as to implement the methods described in the present disclosure. The steps are detailed below and illustrated with reference to FIGS. 5 and 6.

A first embodiment is described with reference to FIG. 5a and FIG. 5b.

Figure 5A:
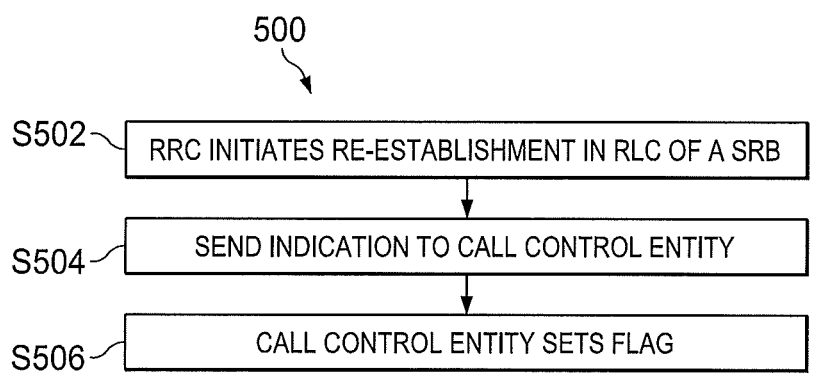
FIG. 5a is a flowchart of a process of providing an indication at the user equipment.
Figure 5B:
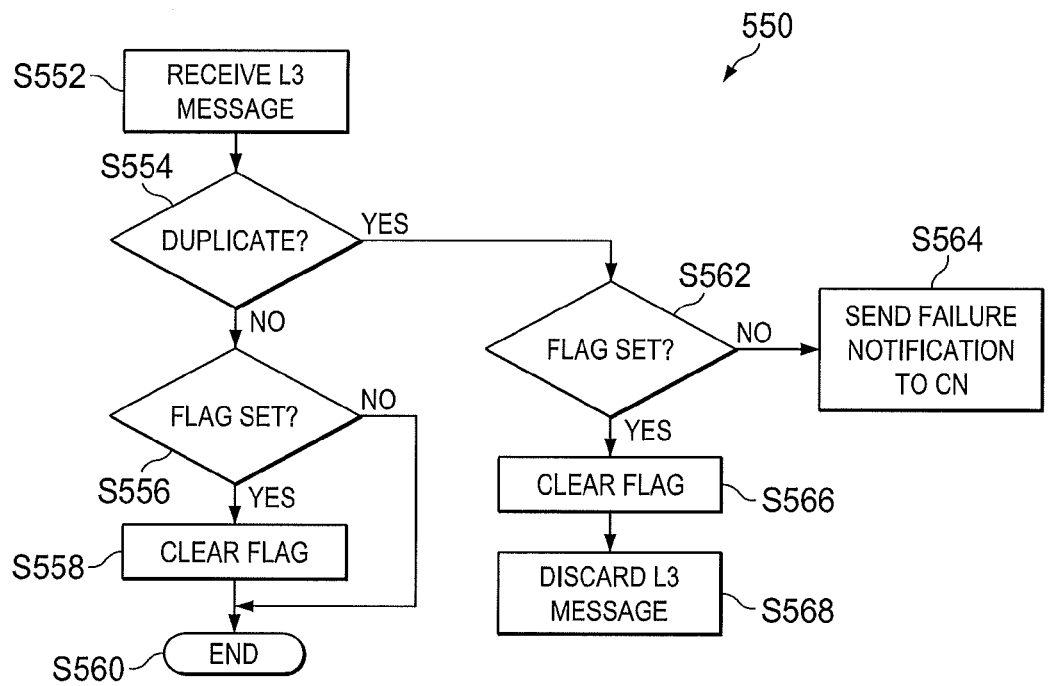
FIG. 5b is a flowchart of a process for handling received messages.

Referring first to the process 500 shown in FIG. 5a, at step S502 the RRC layer 207 initiates a re-establishment in the RLC layer 205 of a signaling radio bearer (SRB) transporting NAS L3 messages. Signaling radio bearer SRB3 and optionally Signaling radio bearer SRB4 may be used for RRC messages carrying higher layer (NAS) signaling.

The RRC layer 207 at the UE 102 may initiate an RLC re-establishment of an SRB transporting NAS L3 messages when commanded to by the UTRAN 105, in a number of different procedures. These procedures are well known to persons skilled in the art so examples are only briefly described herein. When the UTRAN 105 transmits a CELL UPDATE CONFIRM message as part of a cell update procedure with a 'rlc_Re_establishIndicatorRb2__3or4' information element (IE) present, the RRC layer 207 initiates the re-establishment on SRB2, SRB3 and SRB4. The UTRAN 105 can send a number of RRC messages that cause a Serving Radio Network Subsystem (SRNS) relocation procedure to be executed, which causes SRB3 and SRB4 to be re-established. A reconfiguration that causes a change of service data unit (SDU) size of any SRB, will further cause the SRB to be re-established.

Once the RRC layer 207 initiates a re-establishment in the RLC layer 205 of a SRB transporting NAS L3 messages (i.e., SRB3 or SRB4), the process 500 proceeds to step S504. At step S504, the RRC layer 207 sends an indication to the call control entity 210a of the UE 102 indicating the possibility that the next layer 3 message that the call control entity 210a of the UE 102 receives is a duplicate of the latest layer 3 message received at the call control entity 210a of the UE 102.

In response to receiving this indication from the RRC layer 207, process 500 proceeds to step S506. At step S506, the call control entity 210a of the UE 102 is configured to set a flag (maintained by the call control entity 210a of the UE 102) to indicate that the next layer 3 message that it receives from the core network 108 via the UTRAN 105 is potentially a duplicate message.

In accordance with embodiments of the present disclosure, the process 500 is implemented every time the RRC layer 207 initiates a re-establishment in the RLC layer 205 of a SRB transporting NAS L3 messages.

Reference is now made to the process 550 which is implemented during a call setup procedure at the call control entity 210a of the UE 102 in parallel with the process 500 in the first embodiment. At step S552 the call control entity 210a of the UE 102 receives a layer 3 message from the core network 108 via the UTRAN 105. Reference to a "layer 3 message" is used herein to refer to any NAS message that is exchanged between a NAS entity of the UE 102 and a NAS entity in the core network 108.

At step S554, the call control entity 210a of the UE 102 determines whether the layer 3 message received at step S552 is a duplicate of a layer 3 message that was last received at the call control entity 210a of the UE 102. The call control entity 210a of the UE 102 may implement step S554 by checking if it is in a state that could be explained by the same type of message (as the message received at step S552) being received already (i.e., being received earlier than the message received at step S552). Alternatively, step S554 may comprise the call control entity 210a of the UE 102 implementing a complete message comparison of the last received message with the possible duplicate message (message received at step S552).

If, at step S554, the call control entity 210a of the UE 102 determines that the layer 3 message received at step S552 is not a duplicate, the process 550 proceeds to step S556 where the call control entity 210a of the UE 102 determines if the flag (previously described above) is set. That is, at step S556, the call control entity 210a determines if it had previously received an indication from the RRC layer 207 indicating the possibility that layer 3 message received at step S552 is a duplicate of a layer 3 message that was last received at the call control entity 210a of the UE 102.

If the call control entity 210a of the UE 102 determines at step S556 that the flag is not set, i.e., the call control entity 210a had not previously received an indication from the RRC layer 207 indicating the possibility that the layer 3 message received at step S552 is a duplicate of a layer 3 message that was last received at the call control entity 210a of the UE 102, then the process proceeds to step S560 where the normal call control procedure applies (i.e., the call control procedure continues).

If the call control entity 210a of the UE 102 determines at step S556 that the flag is set, i.e., the call control entity 210a had previously received a message from the RRC layer 207 indicating the possibility that the layer 3 message received at step S552 is a duplicate of a layer 3 message that was last received at the call control entity 210a of the UE 102, then the process proceeds to step S558. At step S558, the call control entity 210a of the UE 102 clears (i.e., resets) the flag described above and the process proceeds to step S560 where the normal call control procedure applies.

Referring back to step S554, if at step S554, the call control entity 210a of the UE 102 determines that the layer 3 message received at step S552 is a duplicate, the process 550 proceeds to step S562 where the call control entity 210a of the UE 102 determines if the flag (previously described above) is set. That is, at step S562, the call control entity 210a determines if it had previously received an indication from the RRC layer 207 indicating the possibility that layer 3 message received at step S552 is a duplicate of a layer 3 message that was last received at the call control entity 210a of the UE 102.

If the call control entity 210a of the UE 102 determines at step S562 that the flag is not set, i.e., the call control entity 210a had not previously received an indication from the RRC layer 207 indicating the possibility that the layer 3 message received at step S552 is a duplicate of a layer 3 message that was last received at the call control entity 210a of the UE 102, then the process proceeds to step S564.

At step S564, the call control entity 210a of the UE 102 transmits a failure notification, because of the incompatible state of the call control entity 210a, to the core network 108 via the UTRAN 105. Depending on the network implementation this causes the core network 108 to most likely abort the call setup and this failure is reported to the user of the UE 102.

If the call control entity 210a of the UE 102 determines at step S562 that the flag is set, i.e., the call control entity 210a had previously received a message from the RRC layer 207 indicating the possibility that the layer 3 message received at step S552 is a duplicate of a layer 3 message that was last received at the call control entity 210a of the UE 102, then the process proceeds to step S566. At step S566, the call control entity 210a of the UE 102 clears (i.e., resets) the flag described above and the process proceeds to step S568.

At step S568, the call control entity 210a of the UE 102 discards the duplicate layer 3 message received at step S552 and does not transmit a failure notification to the core network 108 via the UTRAN 105 (i.e., the call control entity 210a of the UE 102 performs a silent discard of the duplicate layer 3 message). Thus, the failure notification is not sent to the core network 108 via the UTRAN 105 when the reason for the duplication (i.e., re-establishment in the RLC layer 205 of a signaling radio bearer) can be detected by the UE 102.

The call control entity 210a of the UE 102 only discards a duplicate layer 3 message at step S568 if it was the first layer 3 message to be received following receipt of the indication at step S504.

Once the flag has been cleared at step S558 or S566, if further Layer 3 messages are received and detected as being a duplicate by the call control entity 210a of the UE 102, the process will proceed to step S564, where the call control entity 210a transmits the failure notification to the core network 108 via the UTRAN 105.

It will be apparent that because no failure notification is transmitted to the core network 108 at step S568, the call setup procedure 300 can continue successfully, notwithstanding the received duplicate message.

A second embodiment is described with reference to FIG. 6a and FIG. 6b.

Figure 6A:
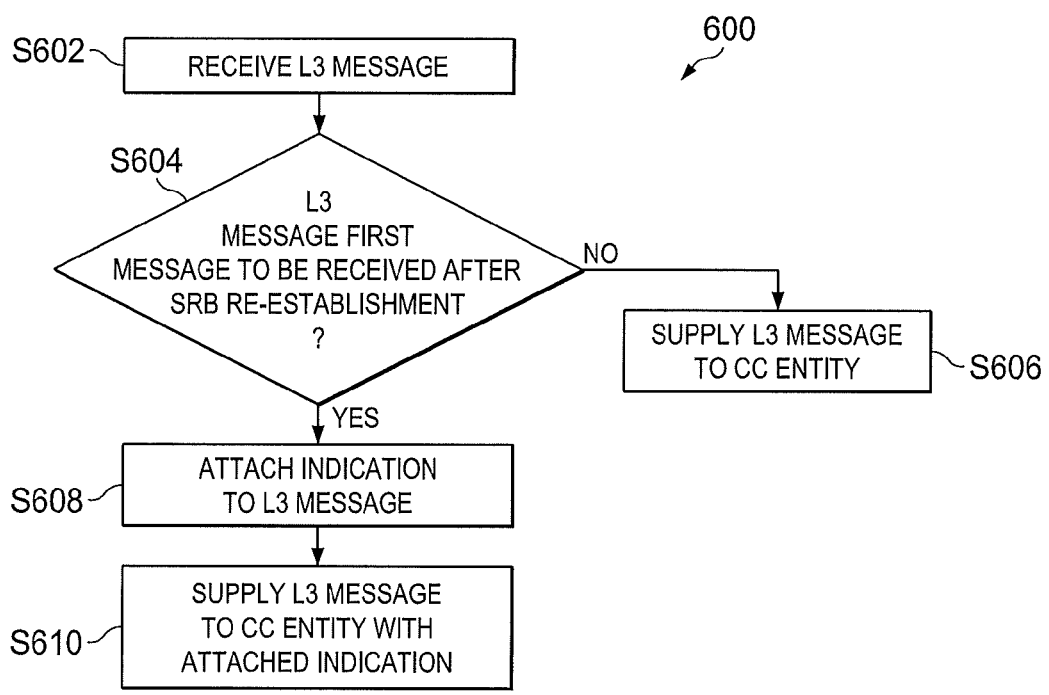
FIGS. 6a and 6b are flowcharts of further processes for handling received messages.
Figure 6B:
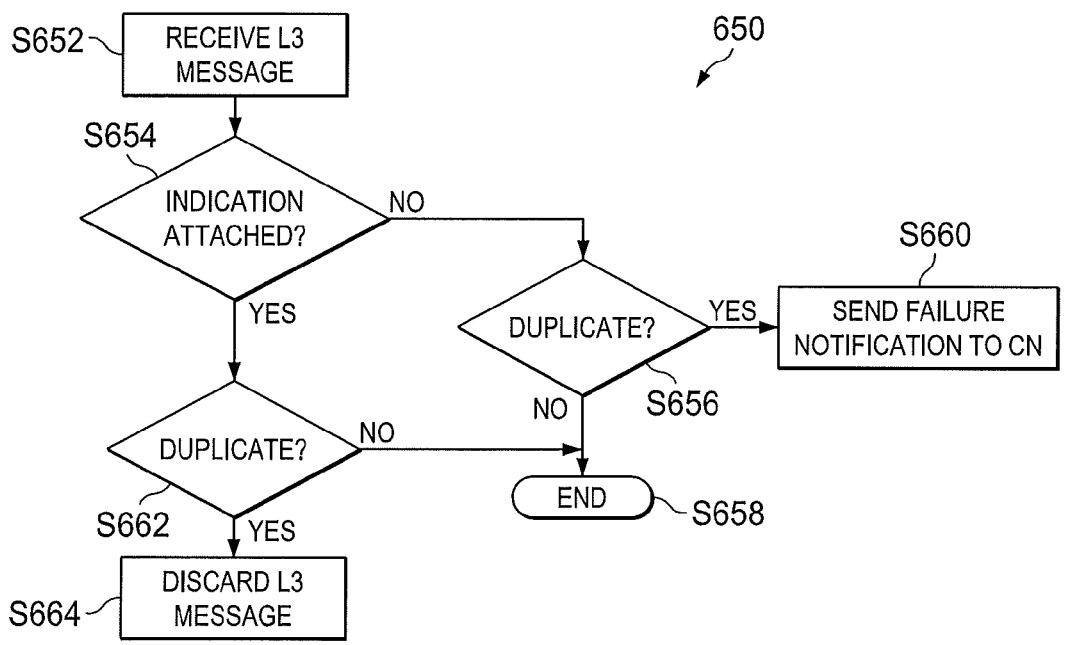

FIG. 6a illustrates a process 600 implemented by the RRC layer 207 of the UE 102.

At step S602, the RRC layer 207 receives a layer 3 message from the lower layers (i.e., supplied from the RLC layer 205) of the layer architecture 200 shown in FIG. 2, and the process then proceeds to step S604.

At step S604, the RRC layer 207 determines if the layer 3 message received at step S602 is the first layer 3 message to be received from the lower layers of the layer architecture 200 after the RRC layer 207 has initiated a re-establishment in the RLC layer 205 of a signaling radio bearer (SRB) transporting NAS L3 messages.

If the RRC layer 207 determines at step S604 that the layer 3 message received at step S602 is not the first layer 3 message to be received from the lower layers of the layer architecture 200 after the RRC layer 207 has initiated a re-establishment in the RLC layer 205 of a signalling radio bearer (SRB) transporting NAS L3 messages, then the process 600 proceeds to step S606. At step S606, the RRC layer 207 supplies the layer 3 message (received at step S602) to the call control entity 210a of the UE 102.

If the RRC layer 207 determines at step S604 that the layer 3 message received at step S602 is the first layer 3 message to be received from the lower layers of the layer architecture 200 after the RRC layer 207 has initiated a re-establishment in the RLC layer 205 of a signaling radio bearer (SRB) transporting NAS L3 messages, then the process 600 proceeds to step S608. At step S608, the RRC layer 207 is configured to attach an indication to the layer 3 message (received at step S602) and at step S610 supply the layer 3 message (received at step S602) with the attached indication to the call control entity 210a of the UE 102. The indication attached to the layer 3 message indicates the possibility that the layer 3 message the indication is attached to is possibly a duplicate of the last layer 3 message received at the call control entity 210a of the UE 102. It will be appreciated that step S608 may be implemented in a number of ways: for example, the indication may be attached such that it precedes the layer 3 message, or such that it is attached to the end of the layer 3 message, or the indication may be provided within a portion of the layer 3 message itself. Regardless of the particular implementation, the indication marks the layer 3 message as a possible duplicate.

To clarify, the layer 3 message supplied to the call control entity 210a of the UE 102 at step S606 does not have the indication referred to above attached to it. That is, the layer 3 message supplied to the call control entity 210a of the UE 102 at step S606 is in the same form as when it was received by the RRC layer 207 from the lower layers of the layer architecture 200.

Reference is now made to the process 650 which is implemented during a call setup procedure at the call control entity 210a of the UE 102 in parallel with the process 600 in the second embodiment.

At step S652, the call control entity 210a of the UE 102 receives a layer 3 message from the RRC layer 207, and the process proceeds to step S654. At step S654, the call control entity 210a of the UE 102 determines whether an indication is attached to the layer 3 message received at step S652.

If, at step S654, the call control entity 210a of the UE 102 determines that an indication is not attached to the layer 3 message received at step S652, then the process 650 proceeds to step S656. At step S656, the call control entity 210a of the UE 102 determines whether the layer 3 message received at step S652 is a duplicate of a layer 3 message that was last received at the call control entity 210a of the UE 102. The call control entity 210a of the UE 102 may implement step S656 in the same manner as in step S554 described above.

If, at step S656, the call control entity 210a of the UE 102 determines that the layer 3 message received at step S652 is not a duplicate, then the process 650 proceeds to step S658 where the normal call control procedure applies (i.e., the call control procedure continues).

If, at step S656, the call control entity 210a of the UE 102 determines that the layer 3 message received at step S652 is a duplicate, then the process 650 proceeds to step S660. At step S660, the call control entity 210a of the UE 102 transmits a failure notification, because of the incompatible state of the call control entity 210a, to the core network 108 via the UTRAN 105.

Referring back to step S654, if at step S654, the call control entity 210a of the UE 102 determines that an indication is attached to the layer 3 message received at step S652, then the process 650 proceeds to step S662.

At step S662, the call control entity 210a of the UE 102 determines whether the layer 3 message received at step S652 is a duplicate of a layer 3 message that was last received at the call control entity 210a of the UE 102. The call control entity 210a of the UE 102 may implement step S662 in the same manner as in step S554 described above.

If, at step S662, the call control entity 210a of the UE 102 determines that the layer 3 message received at step S652 is not a duplicate, then the process 650 proceeds to step S658 where the normal call control procedure applies (i.e., the call control procedure continues).

If, at step S662, the call control entity 210a of the UE 102 determines that the layer 3 message received at step S652 is a duplicate, then the process 650 proceeds to step S664. At step S664, the call control entity 210a of the UE 102 discards the duplicate layer 3 message received at step S652 and does not transmit a failure notification to the core network 108 via the UTRAN 105 (i.e., the call control entity 210a of the UE 102 performs a silent discard of the duplicate layer 3 message). Thus, the failure notification is not sent to the core network 108 via the UTRAN 105 when the reason for the duplication (i.e., re-establishment in the RLC layer 205 of a signaling radio bearer) can be detected by the UE 102.

Embodiments of the disclosure decrease the number of call set up failures that may occur in the communication system 100. In particular, embodiments of the disclosure eliminate call setup failures due to a duplicate message being received at the call control entity 210a of the UE 102 caused by a re-establishment in the RLC layer 205 of a signaling radio bearer. Thus embodiments of the disclosure deliver an improved experience to the user of the UE 102.

Advantageously, default handling of unforeseen message types according to, e.g., TS24.008 chapter 8.4 (for Call Control) is not affected.

It will be appreciated that the above embodiments have been described only by way of example, and other variants or applications may be apparent to a person skilled in the art given the disclosure herein.

For instance, while embodiments above have been described in relation to certain standards such as 3GPP networks and so forth, these are not intended to be limiting and the present disclosure may in fact be applied within any communication standard of any communication network.

Further, although the above has been described in terms of a substantially soft modem implementation, other implementations where more or even all of the described functions are implemented in dedicated hardware are not excluded.

Whilst embodiments of the present disclosure have been placed in context with reference to the mobile originating call establishment procedure shown in FIG. 3, in particular, the possible different protocol states of the call control entity 210a in which the call control entity 210a may receive a layer 3 message, it will be appreciated that embodiments of the disclosure may also be used at the UE 102 in a mobile terminating call establishment procedure described in detail in the 3GPP TS 24.008 specification. Furthermore embodiments of the disclosure are applicable to any call setup procedure wherein the UE may receive messages from a network whilst in different operating states.

Whilst embodiments of the disclosure are described above with reference to the a call control entity 210a of the UE 102 during a call setup procedure, embodiments of the present disclosure may also be applicable to the other entities in the NAS.

For example the NAS entity may be a SMS entity of the CM sub-layer 209. The SMS entity is arranged to operate in one of a plurality of protocol states when performing a short message transfer procedure as described in chapter 5.2 of the 3GPP TS 24.011 specification and is arranged to transmit a failure notification as described in chapters 9.2 and 9.2.3. of the 3GPP TS 24.011 specification.

The NAS entity may be a SS entity 210b of the CM sub-layer 209. The SS entity 210b is arranged to transmit a failure notification as described in chapter 3.7.4 of the 3GPP TS 24.010 specification.

The NAS entity maybe a SM entity 210b of the CM sub-layer 209. The SM entity 210d is arranged to operate in one of a plurality of protocol states when performing a PDP context handling or MBMS context handling procedure as described in chapter 6.1.2 of the 3GPP TS 24.008 specification and is arranged to transmit a failure notification as described in chapter 8.4 of the 3GPP TS 24.008 specification.

The NAS entity may be a MM entity 212a of the MM sub-layer 211. The MM entity 212a is arranged to operate in one of a plurality of protocol states as described in described in chapter 4.1.2 of the 3GPP TS 24.008 specification and is arranged to transmit a failure notification as described in chapter 8.4 of the 3GPP TS 24.008 specification.

The present disclosure is not limited by the described examples but only by the appendant claims.

Those skilled in the art to which this application relates will appreciate that other and further additions, deletions, substitutions and modifications may be made to the described embodiments.

What is claimed is:

1. A method of handling messages at a user equipment received from a communications network during a procedure, the method implemented at the user equipment comprising:

receiving a first message from the communications network whilst the user equipment is in a first operating state;
processing the first message and entering a second operating state in response to receiving the first message;
receiving a second message from the communications network whilst the user equipment is in the second operating state;
detecting that the second message is a duplicate of the first message; and
checking for an indication that the second message is a potential duplicate of the first message, the indication based on re-establishment of a signaling radio bearer; wherein:
if said indication is not present, the method comprising transmitting a failure notification to the communications network; and
if said indication is present, the method comprising discarding the second message and not transmitting a failure notification to the communications network to prevent failure of said procedure.

2. The method of claim 1, wherein the user equipment is unable to process the second message whilst in the second operating state.

3. The method of claim 1, wherein the user equipment communicates with the communications network in accordance with a multi-layered communication protocol comprising a Non-Access Stratum (NAS) and said steps of claim 1 are implemented by a NAS entity.

4. The method of claim 3, wherein the first message is a NAS message and the second message is a NAS message.

5. The method of claim 3, wherein said step of checking for an indication that the second message is a potential duplicate of the first message comprises determining if the second message was detected as potentially being a duplicate of the first message prior to receiving the second message.

6. The method of claim 5, wherein said step of determining comprising the NAS entity determining if it had received said indication from a Radio Resource Control (RRC) layer of the multi-layered communication protocol prior to receiving the second message.

7. The method of claim 6, wherein the RRC layer is configured to transmit said indication to the NAS entity responsive to initiating a re-establishment, in a Radio Link Control (RLC) layer of the multi-layered communication protocol, of a signaling radio bearer used to transport NAS messages.

8. The method of claim 3, wherein said step of the NAS entity checking for an indication comprises determining if an indication is attached to the second message, said indication identifying that the second message is a potential duplicate of the first message.

9. The method of claim 8, wherein the NAS entity receives the second message from the communications network via a Radio Resource Control (RRC) layer of the multi-layered communication protocol.

10. The method of claim 9, wherein the RRC layer attaches said indication to the second message and supplies the second message together with said indication to the NAS entity if the second message is the first NAS message to be received from the communication network after the RRC layer initiating a re-establishment, in a Radio Link Control (RLC) layer of the multi-layered communication protocol, of a signalling radio bearer used to transport NAS messages.

11. The method of claim 9, wherein the RRC layer of the multi-layered communication protocol does not attach said indication to the second message if the second message is not the first NAS message to be received from the communication network after the Radio Resource Control (RRC) layer initiating a re-establishment, in a Radio Link Control (RLC) layer of the multi-layered communication protocol, of a signalling radio bearer used to transport NAS messages.

12. The method of claim 3, wherein the first operating state is a first protocol state associated with the NAS entity and the second operating state is a second protocol state associated with the NAS entity.

13. The method of claim 3, wherein the procedure is a call establishment procedure, and the NAS entity is a Call Control entity.

14. The method of claim 13, wherein the first operating state is a first call control protocol state and the second operating state is a second call control protocol state.

15. The method of claim 3, wherein the NAS entity is one of:
a Short Message Service (SMS) entity;
a Supplementary Services (SS) entity;
a Session Management (SM) entity; and
a Mobility Management (MM) entity.

16. A user equipment comprising:
a transceiver operable to access a communications network;
a central processing unit; and
a memory coupled to the central processing unit, the memory containing program code executable by the central processing unit causing the central processing unit to perform the following steps:
in response to receiving a first message from the communications network via the transceiver whilst the user equipment is in a first operating state, process the first message causing the user equipment to enter a second operating state;
in response to receiving a second message from the communications network via the transceiver whilst the user equipment is in the second operating state, detect that the second message is a duplicate of the first message; and
check for an indication that the second message is a potential duplicate of the first message, the indication based on re-establishment of a signaling radio bearer; wherein:
if said indication is not present, transmit a failure notification to the communications network via the transceiver; and
if said indication is present, discard the second message and not transmit a failure notification to the communications network to prevent failure of said procedure.

17. A computer program product for handling messages at a user equipment received from a communications network during a procedure, the computer program product comprising code embodied on a non-transient computer-readable medium and configured so as when executed on a processing unit of the user equipment to perform the steps of:
receiving a first message from the communications network whilst the user equipment is in a first operating state;
processing the first message and entering a second operating state in response to receiving the first message;
receiving a second message from the communications network whilst the user equipment is in the second operating state;
detecting that the second message is a duplicate of the first message; and checking for an indication that the second message is a potential duplicate of the first message, the indication based on re-establishment of a signaling radio bearer; wherein:
   if said indication is not present, the method comprising transmitting a failure notification to the communications network; and
   if said indication is present, the method comprising discarding the second message and not transmitting a failure notification to the communications network to prevent failure of said procedure.

18. The computer program product of claim 17, wherein the user equipment is unable to process the second message whilst in the second operating state.

19. The computer program product of claim 17, wherein the user equipment communicates with the communications network in accordance with a multi-layered communication protocol comprising a Non-Access Stratum (NAS) and said steps of claim 1 are implemented by a NAS entity.

20. The method of claim 19, wherein the first message is a NAS message and the second message is a NAS message.

* * * * *